(12) United States Patent
Quere (10) Patent No.: US 8,183,802 B2
(45) Date of Patent: May 22, 2012

(54) COMPOSITE ELECTROMECHANICAL MACHINES WITH CONTROLLER

(76) Inventor: Eric Stephane Quere, Los Altos, CA (US)

( * ) Notice: Subject to any disclaimer, the term of this patent is extended or adjusted under 35 U.S.C. 154(b) by 459 days.

(21) Appl. No.: 12/348,318

(22) Filed: Jan. 5, 2009

(65) Prior Publication Data

US 2010/0171450 A1    Jul. 8, 2010

(51) Int. Cl.
*H02P 7/00* (2006.01)

(52) U.S. Cl. ............ 318/269; 318/34; 318/42; 318/362; 318/68; 318/94; 388/835; 388/830; 310/114; 310/113; 310/112; 310/118

(58) Field of Classification Search .................. 318/269, 318/375, 376, 140, 143, 149, 151, 152, 153, 318/159, 34, 42, 45, 50, 68, 362; 180/65.21, 180/65.285; 60/716; 310/114, 113, 112, 310/118; 388/835, 830
See application file for complete search history.

(56) References Cited

U.S. PATENT DOCUMENTS

| | | | | |
|---|---|---|---|---|
| 4,866,321 A * | 9/1989 | Blanchard et al. | ............ | 310/112 |
| 5,229,677 A * | 7/1993 | Dade et al. | .................... | 310/268 |
| 5,481,147 A * | 1/1996 | Kaplan et al. | .................. | 310/181 |
| 5,823,280 A * | 10/1998 | Lateur et al. | ............. | 180/65.235 |
| 6,380,653 B1 * | 4/2002 | Seguchi | .......................... | 310/112 |
| 6,590,312 B1 * | 7/2003 | Seguchi et al. | ............... | 310/266 |
| 7,411,330 B2 * | 8/2008 | Kaneko | .......................... | 310/266 |
| 7,622,875 B2 * | 11/2009 | Atarashi et al. | .......... | 318/400.41 |
| 7,956,504 B2 * | 6/2011 | Quere | .......................... | 310/114 |
| 7,960,884 B2 * | 6/2011 | Miyata et al. | ............. | 310/156.12 |
| 2010/0025131 A1 * | 2/2010 | Gloceri et al. | ............. | 180/65.28 |

* cited by examiner

*Primary Examiner* — Rita Leykin
(74) *Attorney, Agent, or Firm* — Tue Nguyen (57) ABSTRACT

Embodiments of the present invention include a composite electromechanical machine which can operate as a motor, a generator (including dynamo or alternator), or any combination thereof. In an aspect, the present composite electromechanical machine comprises at least a double-sided magnetic plane (e.g., rotor or stator) to form two rotor/stator pairs, together with a controller to configure the multiple rotor/stator pair. The controller can configure or convert the multiple rotor/stator pairs into motors, generators, or nonoperation, and also can change the windings characteristics of the magnetic planes. The controller can add new functionality and characteristics to the present composite electromechanical machine. Other embodiments can also be included.

18 Claims, 13 Drawing Sheets

COMPOSITE ELECTROMECHANICAL MACHINES WITH CONTROLLER

The present invention is related to application Ser. No. 12/210,169, filing date Sep. 12, 2008, entitled "Composite electromechanical machines with gear mechanism", and to application Ser. No. 12/210,171, filing date Sep. 12, 2008, entitled "Composite electromechanical machines with uniform magnets", hereby incorporated by reference.

The present invention relates generally to electromechanical machines, such as motor, generator, dynamo, or alternators, and particularly to composite electromechanical machines.

BACKGROUND

Electromechanical machines such as alternator(s), motor(s), dynamo(s), and generator(s) can convert energy between mechanical energy and electrical energy. For example, an electric motor uses electrical energy to produce mechanical energy, and a generator or dynamo uses mechanical energy to produce electrical energy. In general, an electromechanical machine can operate as a motor or as a generator, depending on the applied input energy. The major differences between a motor and a generator can be in the desired optimization, for example, a motor is designed to optimize speed or torque, and a generator is designed to optimize power generation. Thus the following descriptions are directed to electromechanical machine, which can be equally applied to motors and generator.

The electromechanical machine can convert between mechanical energy and electrical energy through magnetic interaction. From a mechanical point of view, the electromechanical machine comprises a stator which is a stationary part, and a rotor which is a rotating part. For example, a motor converts electrical power to mechanical power in its rotor, through a power supplied to the stator and/or the rotor. From an electrical point of view, the electromechanical machine comprises an armature which is the power-producing component (and which can be either the rotor or the stator), and the field component which is the magnetic field component (and which can also be either the rotor or the stator and can be either an electromagnet or a permanent magnet). The following descriptions use rotor and stator in describing electromechanical machine(s), which can be equally applied to armature(s) and field component(s). In addition, the following descriptions sometimes use the term "magnetic component" or "magnetic plane" of an electromechanical machine to represent either the stator, the rotor, the armature or the field component.

Electrical machines may take the form of DC motors or AC motors with various types such as induction, brushed, brushless, universal, stepper, linear, unipolar, reluctance. However, this classification is not a rigid distinction, especially with advances in electronic control, e.g., moving the commutator out of the motor shell.

There are several ways to supply/generate power to/from an electromechanical machine. In a motor, the supplied power can be from a DC source (DC motor), an AC source (AC motor), or induced in the rotating device (induction motor). AC source can be single-phase or polyphase power systems. For example, two-phase electrical power can have 4 or 3 wires to provide 2 voltage phases, differing by 90 degrees. Three-phase electric power provides 3 voltage phases, differing by 120 degrees. Polyphase power can provide any number of phases, usually three, or a multiple of three.

In addition, motors can incorporate single or double multiphase winding set that is connected to a power supply. For example, doubly-fed electric motors have two independent multiphase windings that actively participate in the energy conversion process, and thus can provide twice the constant torque speed range as singly-fed electric machines.

SUMMARY OF THE DESCRIPTION

Embodiments of the present invention include a composite electromechanical machine which can operate as a motor, a generator (including, but not limited to, dynamo or alternator), or a combination of motor and generator. The present composite electromechanical machine comprises a double-sided magnetic plane (e.g., rotor or stator) with a controller to configure the magnetic planes of the electromechanical machine. The controller can configure a winding of the magnetic plane, configure a functionality (e.g., disabling a portion, forming a composite motor, a composite generator, or a combination of a motor and a generator) or a characteristic (forming motor or generator of different phases) of the electromechanical machine.

In an aspect, the present composite electromechanical machine comprises at least two rotor/stator pairs integrated together. In an aspect, the two stators from the two rotor/stator pairs form a double-sided stator having an inner stator side and an outer stator side. The composite double-sided stator can replace two separate inner stator and outer stator in coupling with an inner rotor and an outer rotor, respectively. In an aspect, the two rotors from the two rotor/stator pairs form a double-sided rotor having an inner rotor side and an outer rotor side. The composite double-sided rotor can replace two separate inner rotor and outer rotor in coupling with an inner stator and an outer stator, respectively. The stator and the rotors can comprise either a permanent magnet or a winding to generate a magnetic field. If the rotors comprise winding, a brush mechanism can be included to accommodate the winding. The composite electromechanical machine can be a brushless machine with the rotor comprising of at least one permanent magnet, and the double-sided stator comprising stator winding(s). The composite electromechanical machine can be a brush machine with the rotor (inner rotor, outer rotor or both rotors) comprising a winding, and the double-sided stator comprising of at least one permanent magnet. The composite electromechanical machine further comprises a controller coupled to the rotor/stator pairs to configure at least a winding of the rotor/stator pairs. Configuring a winding can configure or change the functionality or the characteristics of the rotor/stator pairs.

In an embodiment, configuring or changing the functionality of a rotor/stator pair includes making the rotor/stator pair become either a nonoperation part, a motor or a generator. For example, changing the functionality of a rotor/stator pair can include changing a motor configuration to a generator configuration, and vice versa. The controller can change the function of the composite electromechanical machine to accommodate different situations. For example, a composite electromechanical machine can comprise two rotor/stator pairs. For high motor power, the controller can configure the two rotor/stator pairs to be motor, combining their power. For reducing power, the controller can configure one rotor/stator pair to be nonoperation, such as no power or a small power to offset the magnetic braking is supplied to the rotor, the stator, or rotor/stator pair, leaving one rotor/stator pair to carry the load. If the two motor/stator pairs have different power levels, there can be two levels of power outputs, a low power with the stronger rotor/stator pair becoming nonoperation, and a high power with the weaker rotor/stator pair nonoperation. For a faster reduction of power or speed, the controller can configure one rotor/stator pair to be a generator, essentially providing a braking force on the remaining motor. This configuration can conserve energy, storing the braking power of the motor into electrical power of the generator. Similarly, if the two motor/stator pairs have different power levels, there can be two levels of braking power, a higher braking power with the high power rotor/stator pair nonoperation, and a lower braking power with the low power rotor/stator pair nonoperation. Additionally, anyone or a combination thereof can reverse the rotation of the motor for even stronger braking and coming to a complete stop.

In an aspect, the controller can change the characteristics of the rotor/stator pairs, such as changing the wiring or phase wiring of at least a rotor or a stator. Configuring a winding of a rotor/stator pair can comprise changing the phase wiring of the rotor/stator pair, such as configuring a wiring of the rotor/stator pair (only a rotor, only a stator, or both rotor/stator) to different phases. For example, changing phase wiring can configure the windings of a rotor/stator pair to a higher number of phases for high torque and low speed spinning. The number of phases can be one phase, two phases, three phases, or higher. For example, in a three-phase system, three circuit conductors carry three alternating currents (of the same frequency) which reach their instantaneous peak values at different times. Each current is delayed in time by one-third of one cycle of the electrical current.

In an aspect, the controller comprises a switching matrix to configure the windings. In an aspect, the switching matrix is a separate component, coupled to the controller.

In an embodiment, the present invention discloses a method for configuring a composite electromechanical machine, which preferably comprises at least a double-sided rotor or stator. The machine could be a motor or a generator. The methodology turns a rotor/stator pair to nonoperation configuration, to a motor configuration, or to a generator configuration. In an aspect, the method comprises a monitoring of a desired output. If a higher output is required, additional rotor/stator pairs can be configured to add power. If a lower output is required, one or more rotor/stator pairs can be configured to be nonoperation, reducing the power output. Alternatively, one or more rotor/stator pairs can be configured to be a brake for quickly reducing power. For example, for a motor operation, converting a rotor/stator pair from a motor configuration to a generator configuration provides a braking operation to the motor. For a generator operation, adding additional rotor/stator pairs to the generator can also provide a braking operation. The brake can conserve power through the use of power generated from the generator.

Other embodiments can also be included.

DETAILED DESCRIPTION OF THE PREFERRED EMBODIMENTS

Embodiments of the invention include a composite motor or generator which comprises multiple rotor/stator pairs that are configured as a double-sided stator and/or double-sided rotor and a controller for configuring at least a winding of a rotor/stator pair or for configuring or changing the functionality or characteristics of the rotor/stator pairs.

Figure 1:
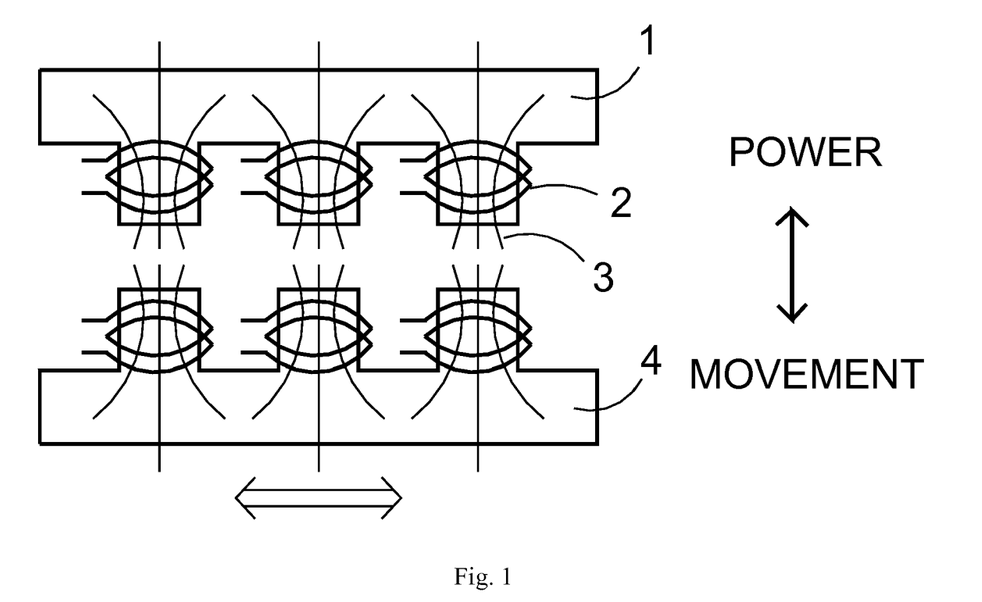
FIG. 1 illustrates an interaction of magnetic field(s) in electromechanical machine.
Figure 2A:
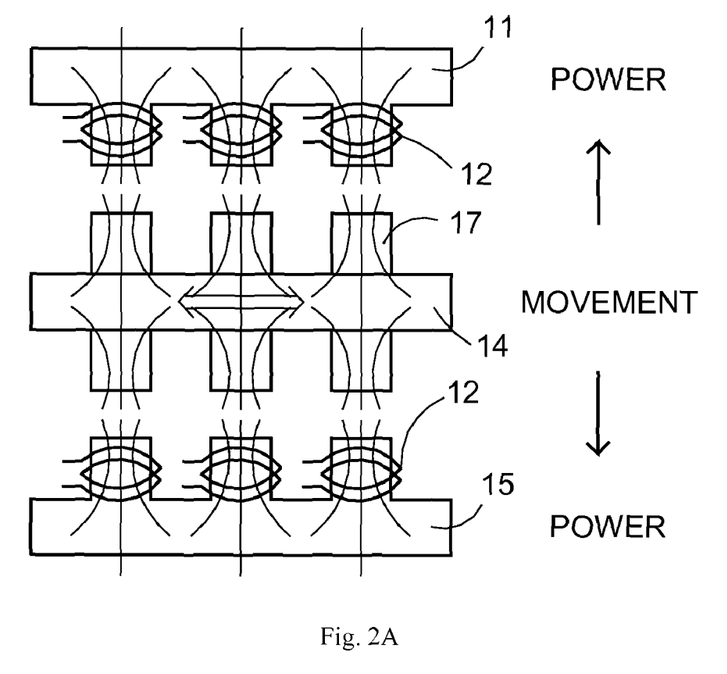
FIGS. 2A-2B illustrate schematic diagrams utilizing a double-sided rotor for generator and motor.

FIG. 1 illustrates the interaction of magnetic field(s) in a motor or generator. A power can be applied to a magnetic plane 1, for example, through the windings 2, to generate a magnetic field 3. Interaction of the magnetic field 3 with another magnetic plane 4 can provide a movement for this magnetic plane 4. Conversely, movement of the magnetic plane 4 can generate power within the windings 2 of the magnetic plane 1. In this configuration, certain magnetic field is directed away from the interaction, and thus does not contribute to the power transfer FIG. 2A illustrates a schematic for a generator using a double-sided rotor, providing a better utilization of the magnetic field. The magnetic plane 14 has magnets 17 (either permanent magnet or electromagnet) generating magnetic field to two other magnetic planes 11 and 15. The magnetic plane 14 in this configuration is a double-sided rotor, and the movement of the magnetic plane 14 generates power in the windings 12 in the stationary magnetic planes 11 and 15. The composite generator includes a pair of stator 11 and rotor 14, together with a pair of stator 15 and rotor 14. The rotor 14 is double-sided, thus acting as two rotors for interacting with two stators 11 and 15.

Figure 2B:
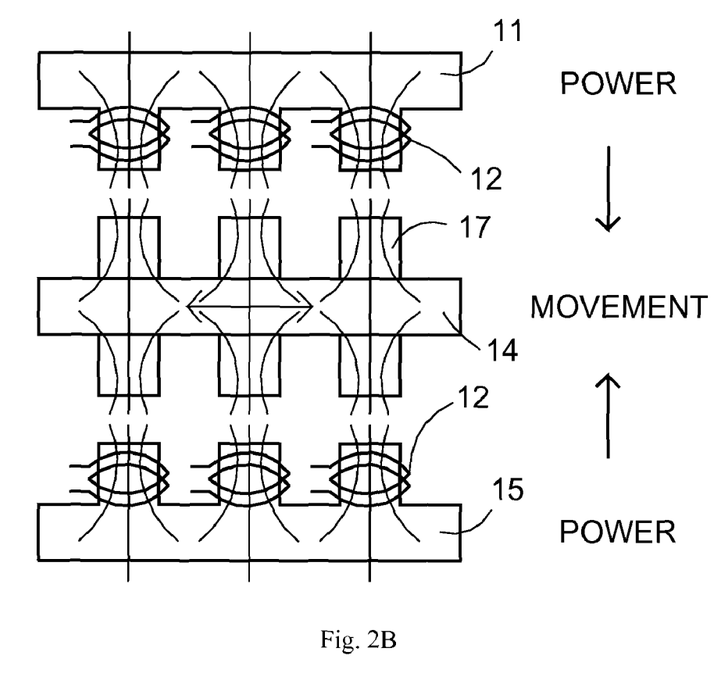

Similarly, FIG. 2B illustrates a motor utilizing a double-sided rotor with the same configuration as that of FIG. 2A. Power applied to the windings 12 of the stationary stators 11 and 15 generates a magnetic field, which interacts with the double-sided rotor 14 to move the rotor 14. In these configurations, a double-sided rotor can provide a composite machine, comprising two individual machines.

Figure 3A:
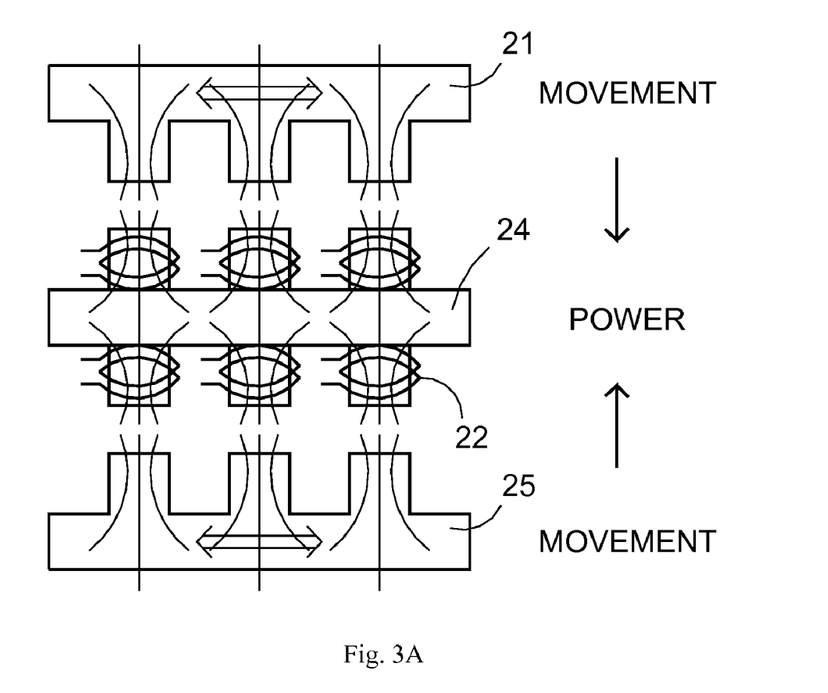
FIGS. 3A-3B illustrate schematic diagrams utilizing a double-sided stator for generator and motor.
Figure 3B:
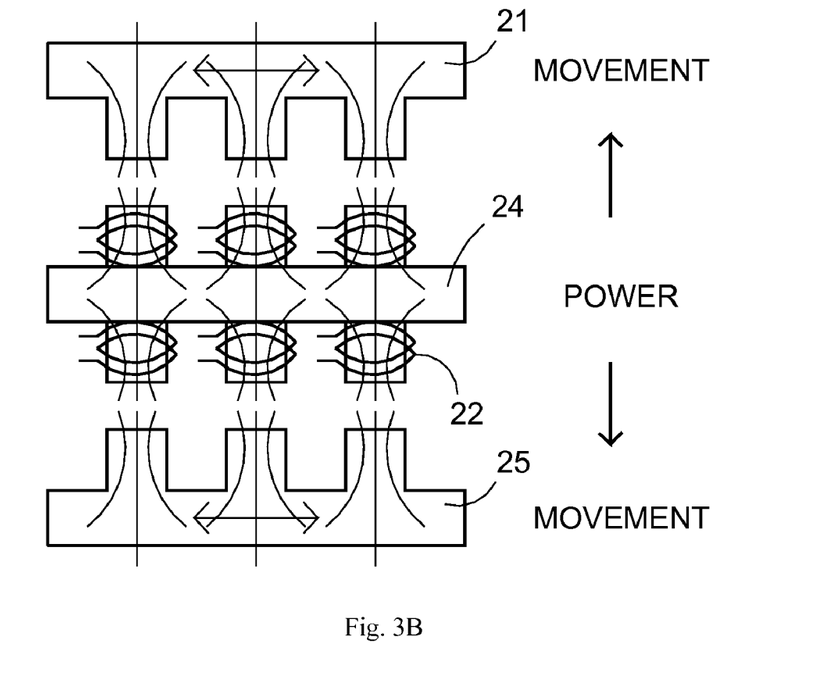

FIGS. 3A and 3B illustrate a schematic for a generator and a motor, respectively, using a double-sided stator 24. The movement of the inner and outer rotors 21 and 25 can generate a magnetic interaction in stator 24, leading to power generation in windings 22 (FIG. 3A). Conversely, power can be applied to the double-sided stator 24 to generate movement in both rotors 21 and 25 (FIG. 3B).

The present invention relates to an electromechanical machine employing a double-sided stator/rotor and dual rotors/stators, respectively, with a controller for configuring a winding connection of the stator, rotor or both, and for configuring or changing a functionality or characteristic of the electromechanical machine. The present electromechanical machine can possess a variety of functions based on different configurations of the windings arrangements of the stator and rotor pairs, such as high torque density, fast brake, and high efficiency.

In an embodiment, the electromechanical machine preferably includes at least one double-sided stator and at least a rotor having inner and outer working sides. The stator is inserted between the inner and outer working sides of the rotor with air gap(s) between a rotor/stator surface pair, forming a rotor-stator/stator-rotor structure. The stator preferably includes an inner stator side, an outer stator side, generally has a hollow cylindrical shape, with permanent magnet or slotted or non-slotted with winding to form electromagnet. In an aspect, the stator has a winding with a plurality of polyphase windings of electrical wires. The rotor has a generally cylindrical shape which includes an inner rotor component and an outer rotor component. The rotor can also include two separate rotors, an inner rotor and an outer rotor.

In an embodiment, a plurality of permanent magnets is mounted to the working sides of the rotors to form a brushless configuration. Alternatively, windings can be employed on the rotors to form brushed configuration.

Figure 4A:
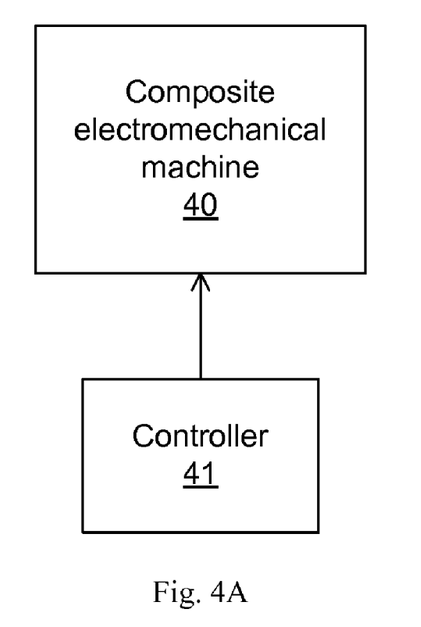
FIGS. 4A-4D illustrate various embodiments of the present electromechanical machine.

FIG. 4A illustrates a schematic configuration of an embodiment of the present apparatus, comprising a composite electromechanical machine 40 and a controller 41. The composite electromechanical machine comprises at least a double-sided rotor or a double-sided stator to form at least two rotor/stator pairs where each rotor/stator pair can operate as an electromechanical machine, e.g. a motor or a generator. The controller 41 is coupled to the composite electromechanical machine 40 and is capable of configuring the composite electromechanical machine 40. For example, the controller 41 can configure the functionality of the various rotor/stator pairs of the composite electromechanical machine to be nonoperation, motors, generators or any combination thereof The controller 41 can configure the characteristics of the various rotor/stator pairs of the composite electromechanical machine such as the phase windings so that a motor can have different speed or torque, or a generator can have different output phases. In an aspect, the controller 41 is connected to the wirings of the rotors and stators, and thus can change or configure at least a wiring of the rotor or stator.

In an embodiment, the controller 41 can configure (or change) any number of rotor/stator pairs. For example, for a composite machine (e.g., motor or generator) having 2 rotor/stator pairs, the controller can turn one rotor/stator pair into a nonoperation machine to reduce the power output. The controller can also turn a rotor/stator pair into a generator to generate a braking action for re-using braking energy.

Figure 4B:
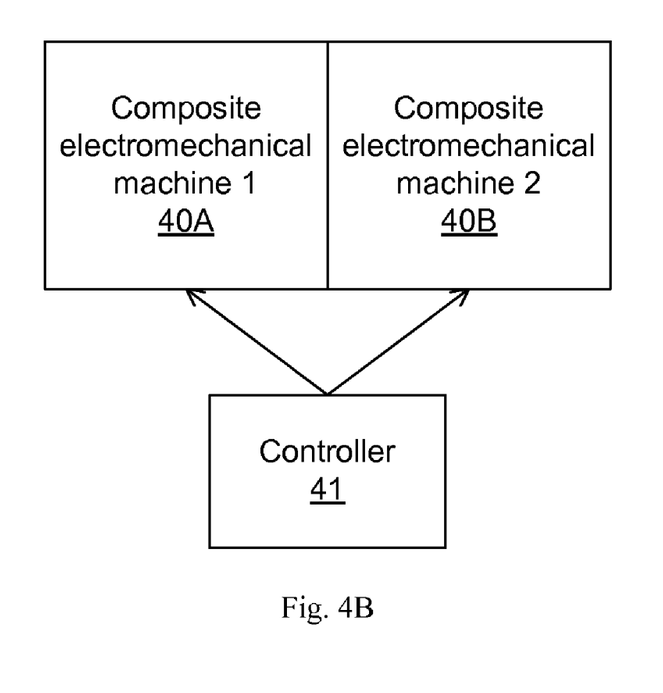

FIG. 4B illustrates another schematic configuration of an embodiment of the present apparatus, comprising two composite electromechanical machines 40A and 40B and a controller 41. The controller 41 can configure the composite electromechanical machines 40A and 40B, preferably through changing the wiring connections, to be nonoperation, motor, generator, or any combination thereof.

Figure 4C:
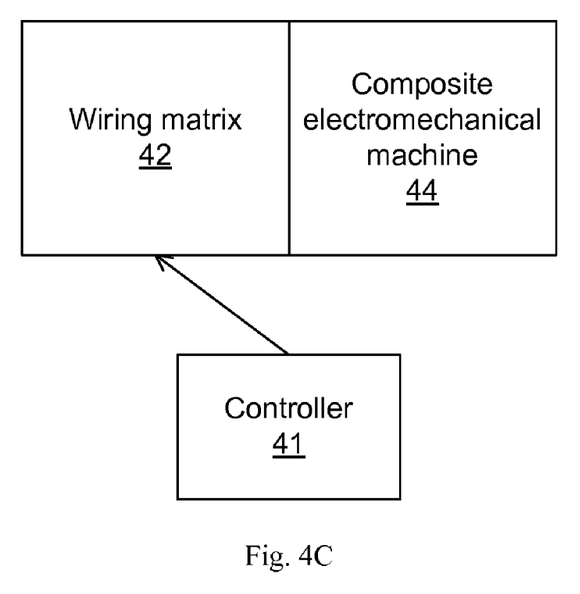
Figure 4D:
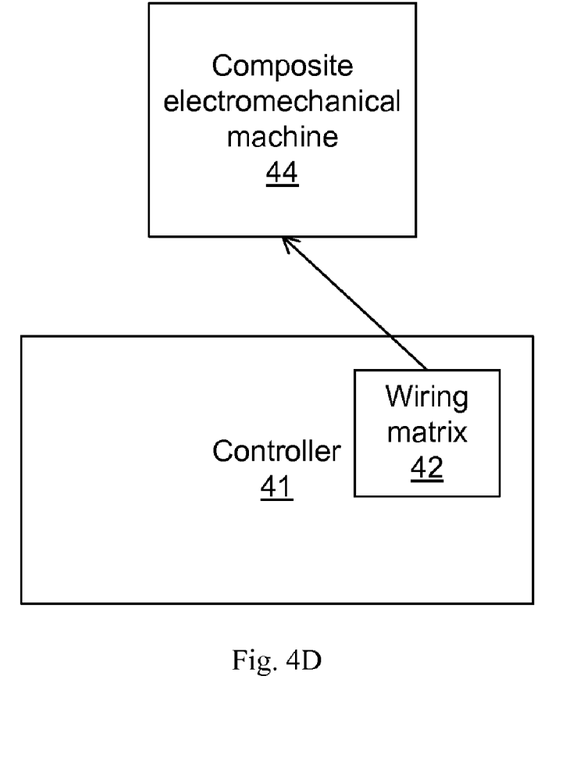

FIG. 4C illustrates an embodiment of the present machine where a wiring matrix 42 such as a switching matrix is connected to the composite electromechanical machine 44, preferably through the wiring or electrical windings of a rotor or stator. The controller 41 can configure the composite electromechanical machines 44 through the wiring matrix 42. FIG. 4D illustrates an alternate embodiment where the wiring matrix 42 is a part of the controller 41.

Figure 5:
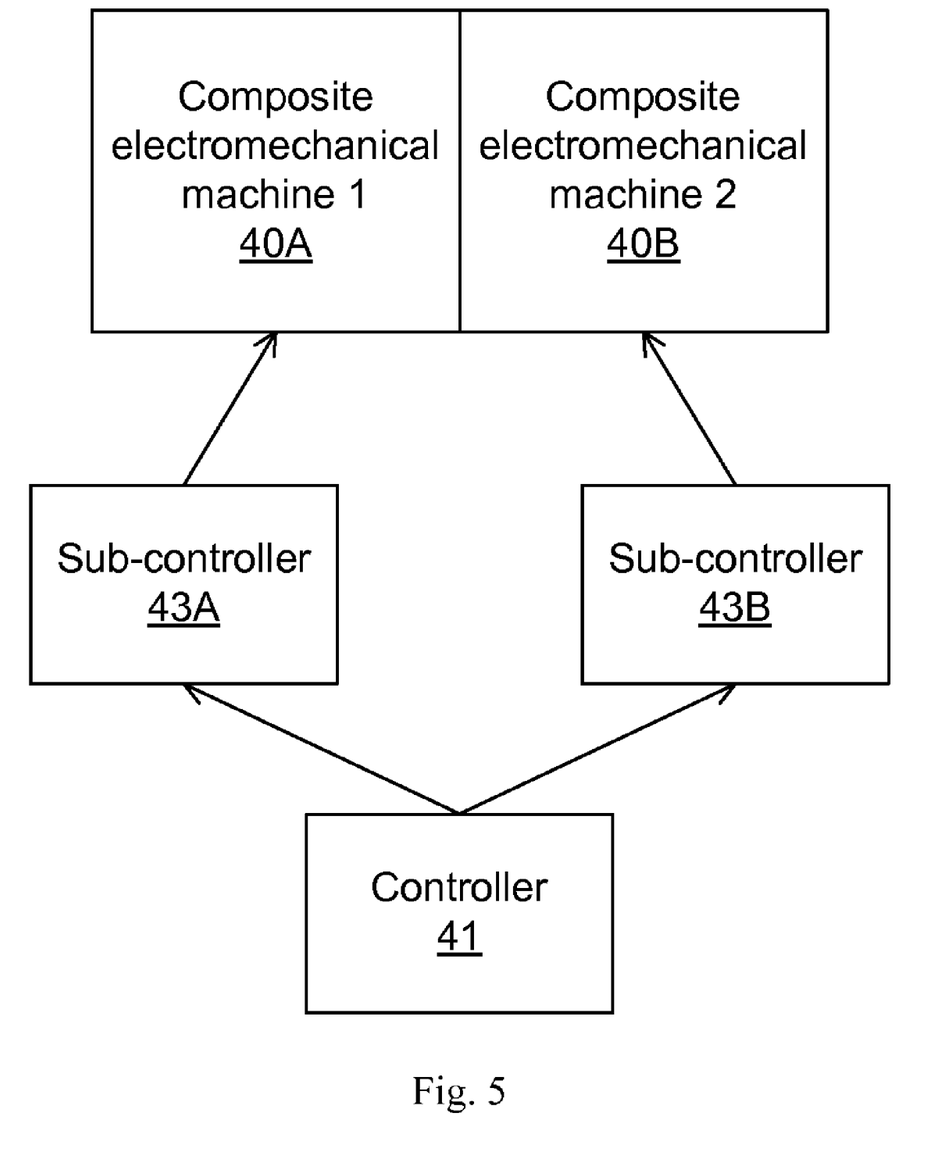
FIG. 5 illustrates another embodiment of the present electromechanical machine.

FIG. 5 illustrates an embodiment of the present machine comprising two composite electromechanical machines 40A and 40B with two sub-controllers 43A and 43B, which are connected to the controller 41. The controller 41 configures the machines 40A and 40B through the sub-controllers 43A and 43B. Wiring matrices can be incorporated in the machines 40A, 40B, or in the sub-controllers 43A, 43B.

Embodiments of the present invention present a novel type electric motor/generator with many unique concepts and configurations, such as the combination of at least two electric machines into one, effectively reducing the amount of needed materials and multiplying the output force by the number of machines combined.

In an embodiment, the machine can be a motor having low-speed high-torque. High-speed design can require a gearing arrangement to reduce the speed and increase the torque output. Low speed high torque motor can eliminate the need for a gearing arrangement, resulting in a significant benefit in cost, material consumption, and overall weight.

An embodiment focuses on the combination of two electric motors (or generators, or any combination of motors and generators). This is accomplished by using both sides of the stator, making a double-sided stator, and/or by using both sides of the rotor, making a double-sided rotor. Each one of these double-sided configurations is constructed to form a single plane (Stator Plane or Rotor Plane).

In an aspect, each type of plane is connected to the appropriate back plates. The stator back plate is held stationary and is the mounting point for the motor. The rotor back plate is connected to the output mechanism. The double-sided stator/rotor can be wound in any feasible manner and the windings can be either separate or combined as one. Alternatively, permanent magnets can be used.

The present electromechanical machine can be constructed with permanent magnets or electromagnets, and it can function as an alternator/generator producing electrical energy. The present machine can generate induced electrical energy through normal operation, for example, additional windings can be included into the design to produce electrical power from normal operation of the motor, without resistance to its normal rotation.

Typically the magnetic planes (rotor or stator planes) are planar or concentric. There can be any number of magnetic planes. Magnetic planes can be cylindrical in shape. Outer planes are hollow cylinder to allow for the insertion of a smaller diameter magnetic planes or the motors main transmission shaft. They are either a representation of a multi-sided/multidirectional stator/rotor, or a multi-sided armature/field. The magnetic planes can have each side wired individually, thereby giving full control of each of the magnetic planes, for whichever function is desired. The magnetic plane can be a multi-sided field/armature/stator/rotor having multiple sides. This plane is constructed on a magnetic plane. Generally, one magnetic plane is located on the outside surface of the double-sided magnetic plane while another one is located on the inside surface of the double-sided magnetic plane. In addition, other magnetic planes can be added at various other locations and directions and orientations.

The permanent magnets are preferably radially magnetized, but may be magnetized using blocked, tapered, parallel, or interleaved methods. In addition, the permanent magnets may be comprised of ferrite magnets or rare earth magnets or compressed magnetic material.

The working surface includes a plurality of inwardly extending teeth to receive polyphase windings of electrical wires wound around the teeth. A plurality of polyphase windings of electrical wires is preferably toroidally-wound around the stator. The windings are preferably wound as back-to-back windings. The stator may be formed by a plurality of stacked laminations that are connected together, or alternatively, may be formed by a magnetic powdered material that is compressed together or some combination thereof. The windings wound around the stator may comprise toroidally-wound windings, lap windings, wave windings, or other types of windings know in the art.

Figure 6A:
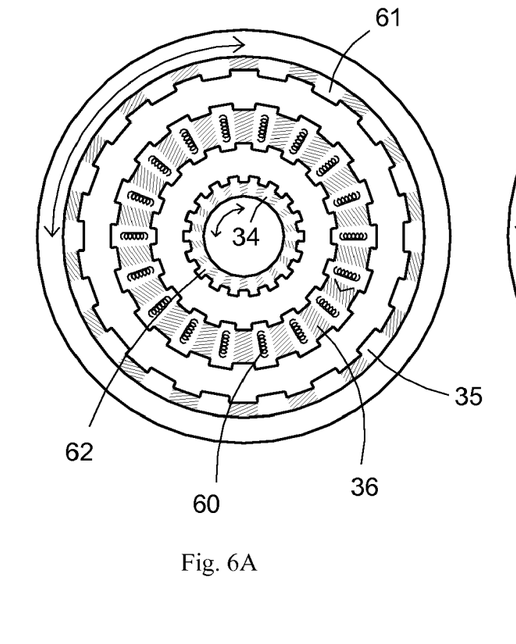
FIGS. 6A-6B illustrate brushless and brushed schematic diagrams with a double-sided stator.
Figure 6B:
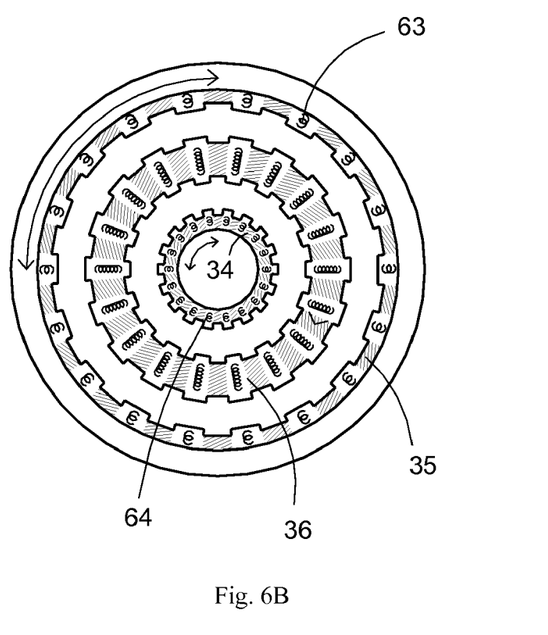

FIGS. 6A-6B illustrate an embodiment of the present machine, with the double-sided stator/rotor 36 comprising a plurality of electromagnet windings 60 for generating magnetic field(s) to an inner rotor/stator 34 and an outer rotor/stator 35. FIG. 6A shows a brushless embodiment where the rotors have permanent magnets 61 and 62. FIG. 6B shows a brushed embodiment where the rotors have electromagnet windings 63 and 64.

Figure 7:
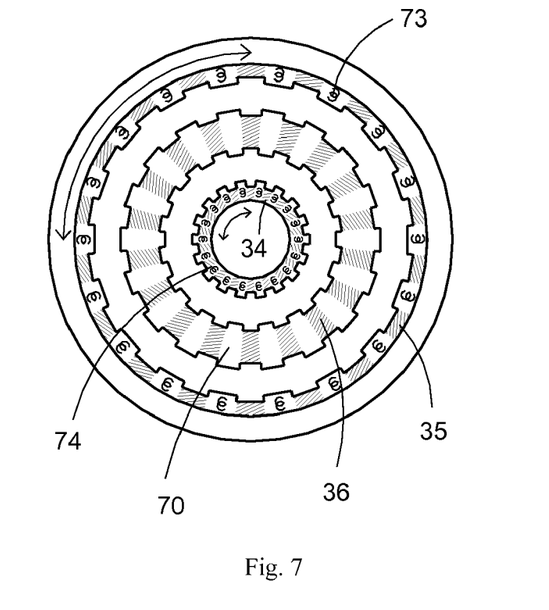
FIG. 7 illustrates a brushed schematic diagram with a double-sided stator.

FIG. 7 illustrates an embodiment of the present machine, with the double-sided stator/rotor 36 comprising a plurality of permanent magnets 70 for generating magnetic field(s) to an inner rotor/stator 34 and an outer rotor/stator 35. FIG. 7 shows a brushed embodiment where the rotors have electromagnet windings 73 and 74.

FIGS. 8A-8F illustrate various configurations for the present electromechanical machine having a double-sided stator (or rotor) and dual inner/outer rotors (or stators) working like two conventional machines, with one machine on the inside and the other machine on the outside.

Figure 8A:
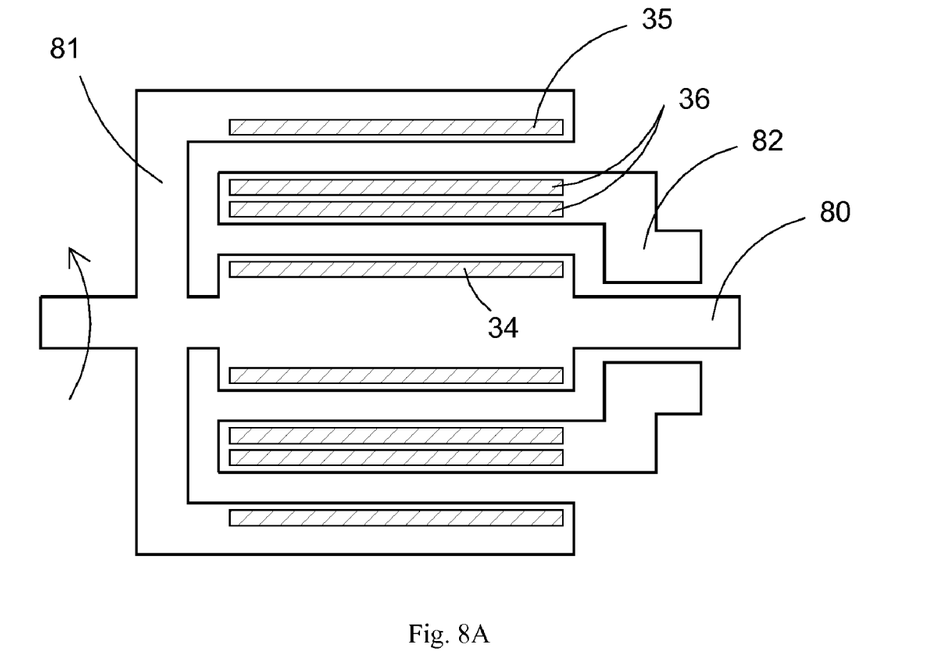
FIGS. 8A-8F illustrate various electromechanical machines according to embodiments of the present invention.

FIG. 8A shows an embodiment of the present machine where the rotors and stators are attached to back plates 81 and 82. As shown, the back plate 81 is rotatable and contains the rotors 34 and 35, and the back plate 82 is stationary (or attached to the rotating axis 80 through a bearing mechanism) and contains the double-sided stator 36. Alternatively, the back plate 81 can be stationary with the rotors 34, 35 become stators, and the back plate 82 is rotatable with the double-sided stator 36 become a double-sided rotor. The magnetic planes (rotors or stators, 34, 35 and 36) can have embedded magnets (permanent or electromagnets) to provide interacting magnetic field. The magnets in the double-sided magnetic plane can provide substantially similar magnet field as disclosed above. The rotors and the double-sided stator can be coupled through a device that allows free axle rotation, such as a bearing (not shown).

Figure 8B:
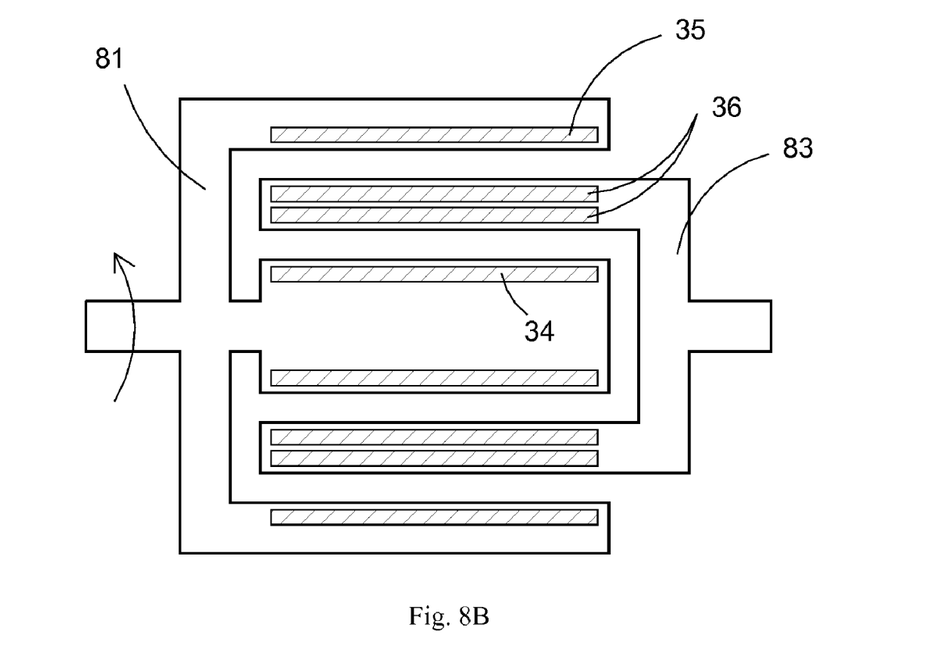

FIG. 8B shows an embodiment of the present machine where the rotors and stators planes are attached to a back plate 81 and 83. As shown, the back plate 81 is rotatable and back plate 83 is stationary, but in another embodiment, back plate 81 can be stationary and back plate 83 is rotatable. Alternatively, both back plates can be rotatable. Inside the electromechanical machine are several layers of magnetic planes, each one following the circumference of the machine at progressively smaller diameters. The magnetic planes can be a short solid or hollow cylinder with closed ends. The magnetic planes are partitioned in two sections, one section is stationary and one section is rotating. Either section can have permanent or electromagnets. If the rotating section contains the electromagnets then a brush assembly is required. If the rotating section contains the permanent magnets then a controlling/timing device is needed, instead of the brushes.

In an aspect, the back plates are constructed of a very high strength metal, plastic or an alloy, in which there is no flexibility, mainly to provide the strength and stability of the machine. These plates can also provide the enclosure. Each of the plates has affixed to them the magnetic planes, either the electromagnet planes or the permanent magnet planes. In an embodiment, between each of these equally spaced magnetic planes is a groove, which can allow the plane affixed to the other back-plate to have a mounting point. Also it can be a slide-bearing race allowing the planes to rotate freely while still providing great strength and stability to the machine, by providing a support on both sides of the planes.

In an aspect, the two back-plates can also be held to each other by a fastener assembly. The rotating back-plate can have a case around it with a bearing race allowing the rotating back-plate to be held in place and still able to move freely in a circular motion. In an embodiment, the back-plate can be slotted to create a fan like action with one side designed for intake and the other designed for exhaust, which provides positive airflow across the internals of the motor providing a cooling effect.

The magnetic plane is a curved rectangular plate, which contains a series of magnet, arranged in latitude, and sequenced in alternating polarity (e.g., positive, negative, positive, negative). These plains will have magnets attached to them in such a way as to allow the magnet to protrude through the plains allowing an equally powerful magnetic force to exert influence both on the in-side and the out-side of the plain. These magnets are strategically located as to provide the maximum amount of torque possible combined with the greatest efficiency. There is always one plane, which is situated above and below each other, except for the layer closet to the shaft, and the outer most layer as well. The electromagnet or group of electromagnets is designed to provide the greatest amount of torque, yet utilizing the least amount of electricity, thus effectively reducing the heat created within the motor, through the current flow.

In an embodiment, the machine can have a shaft or a shaft-sleeve. The concept behind the shaft sleeve is to provide for a stacking feature, where any number of motors can be added or removed, to/from a common shaft. This common shaft accommodates the possibility to combine the output of several electric motors onto one shaft, without the mechanical loss associated with gearing systems. In this configuration, the output force is multiplied by the number of motors on the shaft. An additional benefit of the stacking feature is instead of replacing the motor when the power requirement changes or it fails, just add or remove one or more motors.

The shaft of the machine can be made longer than the body of the motor having the shaft extended from the motor on either end or both depending on its application. This shaft can be used to add additional motors thereby creating a stack of motors. These additionally stacked motors can also function independently all the way down to the individual plane level in each of the separate motors. Alternately, the shaft can be replaced by a sleeve, hollowed, grooved and/or keyed inside, allowing for the insertion of a shaft. The shaft can be secured by any feasible method. This can facilitate the stacking of these motors. Further, each motor/generator can be powered on or off as needed.

The composite machine can be configured to combine their power, thus significantly increasing the torque or speed of a motor, or the power generation of a generator.

Figure 8C:
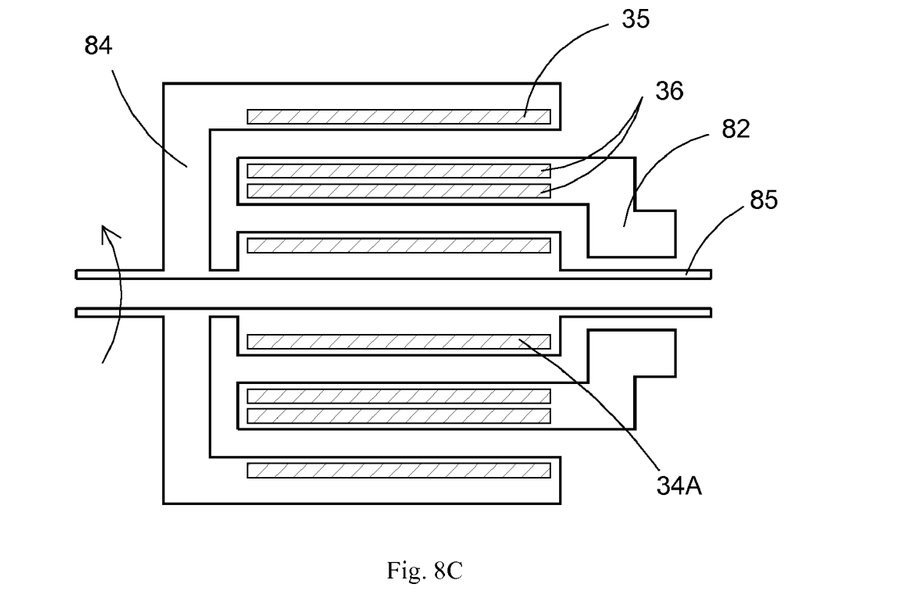

FIG. 8C shows an embodiment incorporating a shaft sleeve 85. The inner rotor 34A is a hollow cylinder to accommodate the shaft sleeve. Alternatively, the inner rotor can be a solid cylinder (not shown) where the shaft sleeve 85 is hollow outside the solid cylinder. The shaft sleeve 85 is connected to a back plate 84 for rotation. Alternatively, the back plate 84 and the shaft sleeve 85 are stationary, and the back plate 82 is rotatable.

In addition, cooling mechanism can be incorporated for cooling purpose. A fan mechanism at each end of the machine creates positive ventilation, such as a back-plate and a front-plate holding the rotors and stator can be slotted to create a fan-like action/effect. This can be used to provide sufficient airflow across the internals of the motor, providing a cooling effect. For example, a fan at one end is used for intake and slots/openings at the other end are used for exhaust. Any type of aspiration method can be used, as long as it or in combination with, can supply sufficient air intake for purposes of transferring heat. In addition, heat transfer for the machine can be increased and improved by the addition of highly conductive material(s) for thermal management. An attachment or method to hold a filtering device can be incorporated on all ends, or a permanent filter can be used.

Figure 8D:
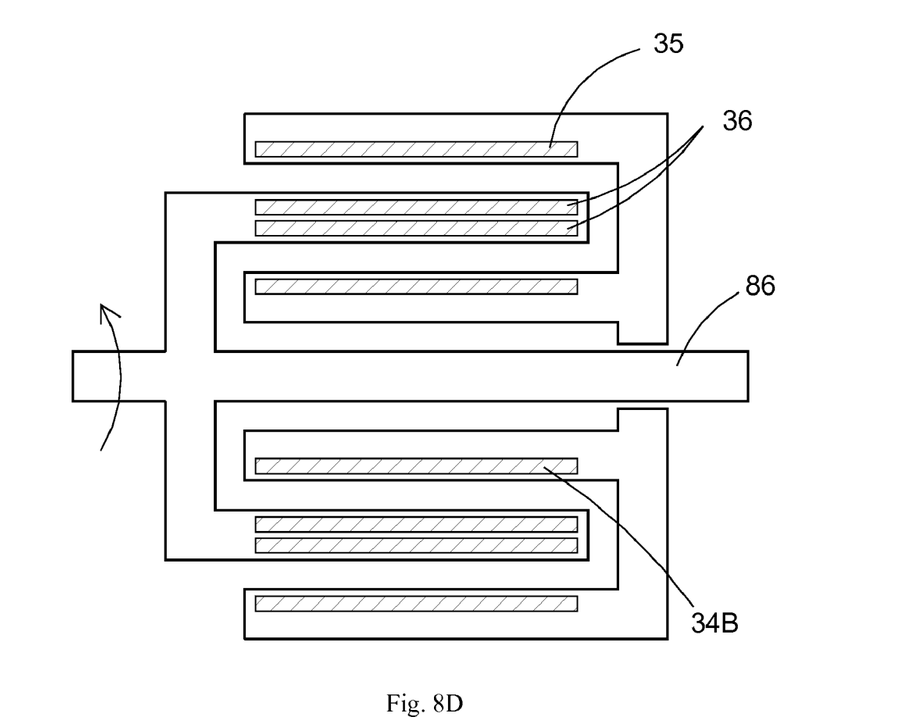

FIG. 8D shows an embodiment where the innermost stator 34B is a hollow cylinder, with a shaft 86 (or a shaft sleeve, not shown) passing through.

Figure 8E:
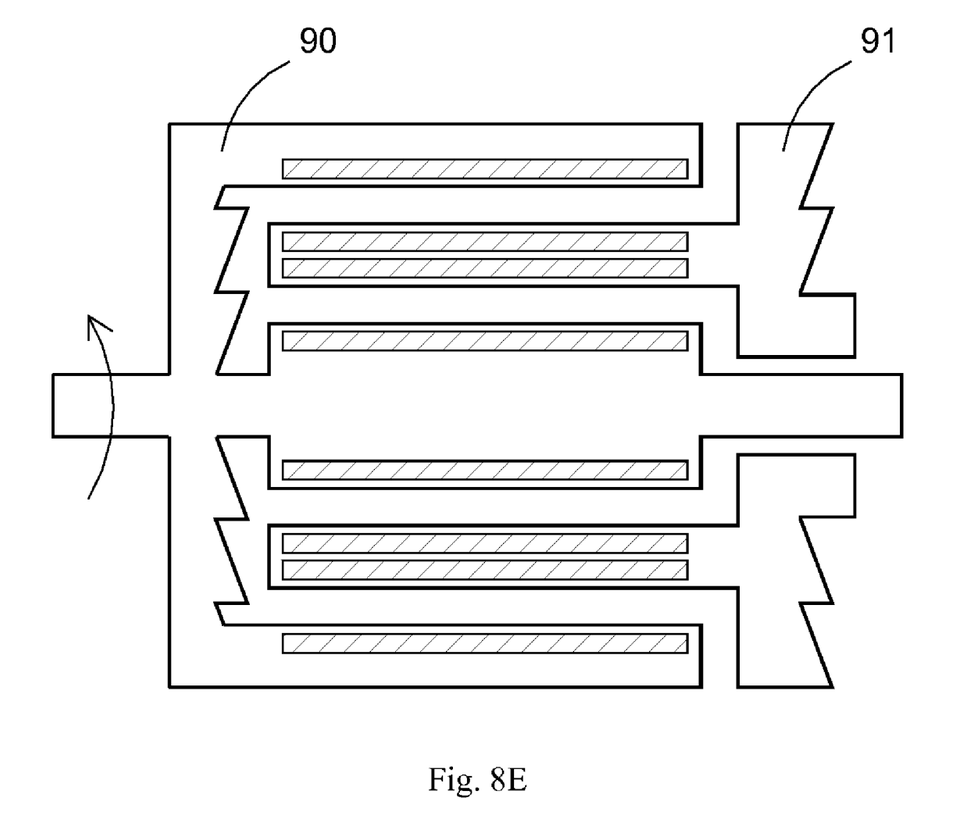

FIG. 8E shows an embodiment incorporating a fan mechanism at the ends of the rotor/stator pairs. Two fan-like blades 90 and 91 can be slotted to create an air flow across the rotors and stator for cooling purpose. The configuration shows a schematic of the fan tabs, but in general, the fan tabs can be facing any directions, for example, the fan tabs could go through the side plates.

Figure 8F:
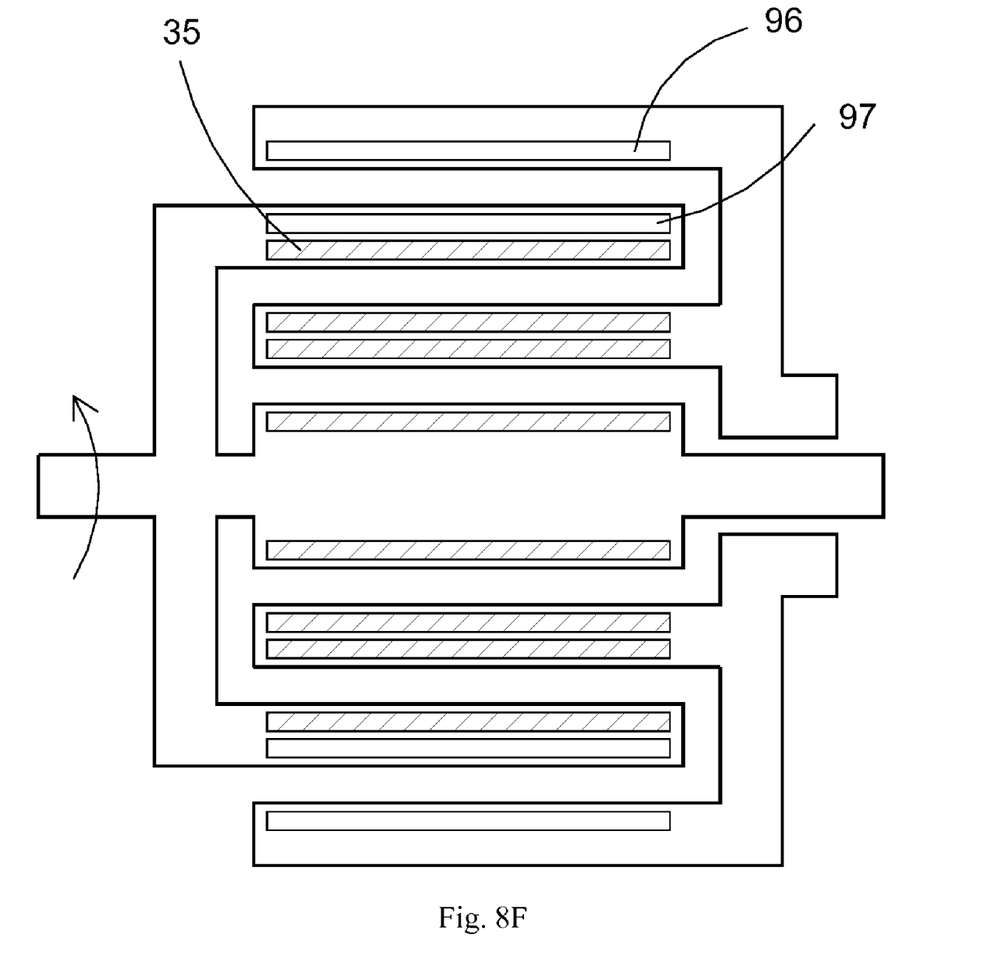

FIG. 8F shows an embodiment incorporating an additional rotor/stator pair. The outer rotor 35 is converted to a double-sided rotor 97 and an additional outer stator 96 is added. The incorporation of the addition rotor/stator pair can further enhance the power of the machine.

Figure 9:
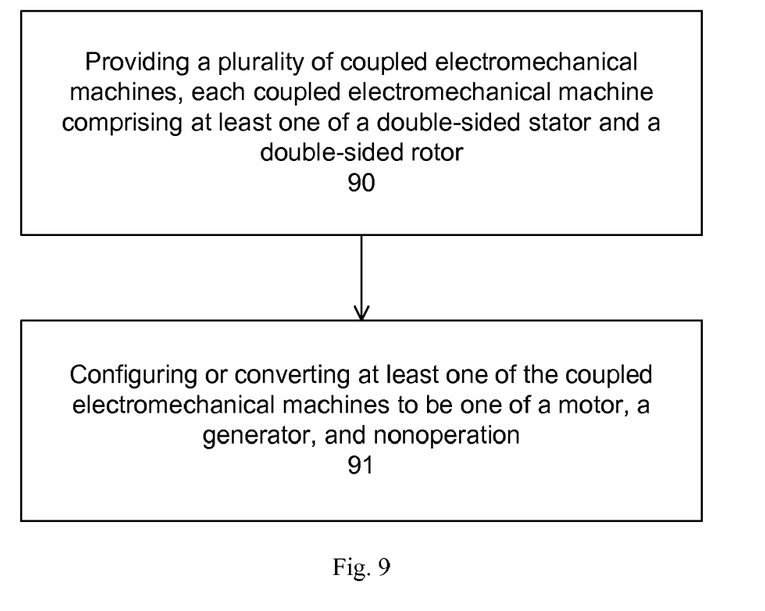
FIG. 9 illustrates a method of configuring an electromechanical machine according to an embodiment of the present invention.
Figure 10:
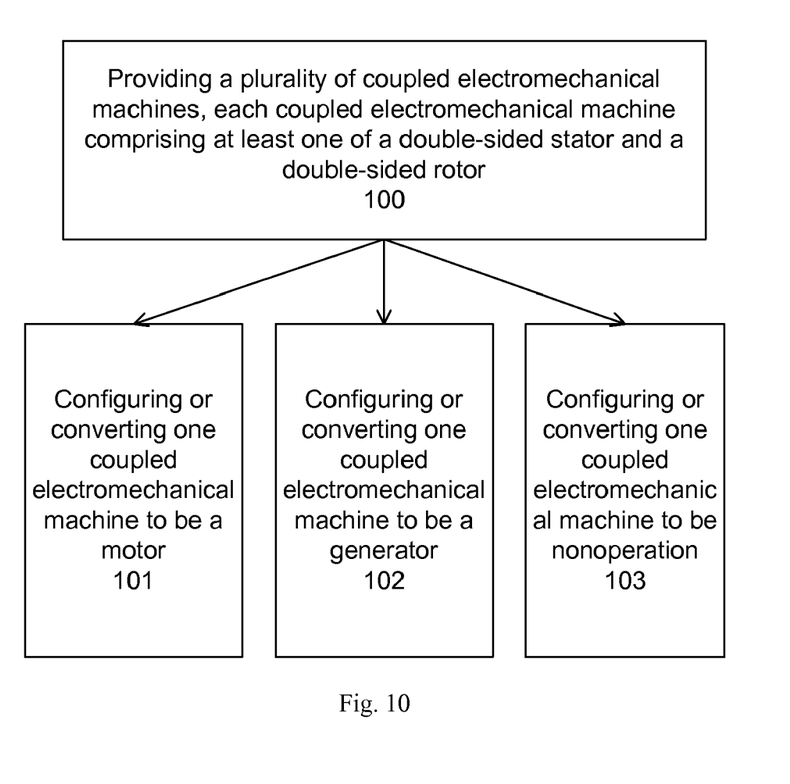
FIG. 10 illustrates another method of configuring an electromechanical machine according to an embodiment of the present invention.

In an embodiment, the present invention discloses methods for configuring the composite electromechanical machine having at least a double-sided rotor or stator. In FIG. 9, operation 90 provides a plurality of coupled electromechanical machines with at least one electromechanical machine having at least a double-sided rotor or stator. Operation 91 configures or converts at least one of the electromechanical machines to either a motor, a generator or nonoperation. A motor configuration can be either forward or reverse rotation. A generator also can be configured to generate forward or reverse polarity. A nonoperation configuration can receive zero power or a small amount of power (of either polarity) to offset the magnetic braking. In FIG. 10, operation 100 provides a plurality of electromechanical machines. Operation 101 configures or converts one machine into a motor, having either forward or reverse rotation. Operation 102 configures or converts one machine into a generator, having either polarity. Operation 103 configures or converts one machine to be nonoperation, having zero power or a small power to overcome the magnetic braking power.

Converting to nonoperation can act to reduce the power output, for example, to slow down a motor, or to generate less motor power or less electrical power. Converting a running machine or configuring an idle machine to a motor with the same rotation can act to add motor power, torque or speed. Converting a running machine or configuring an idle machine to a motor with the opposite rotation can act to actively reduce motor power, torque or speed. Converting a running machine or configuring an idle machine to a generator can act to brake a motor with re-usage of the braking power in the form of electrical power instead of wasting the braking power to friction heat.

Figure 11:
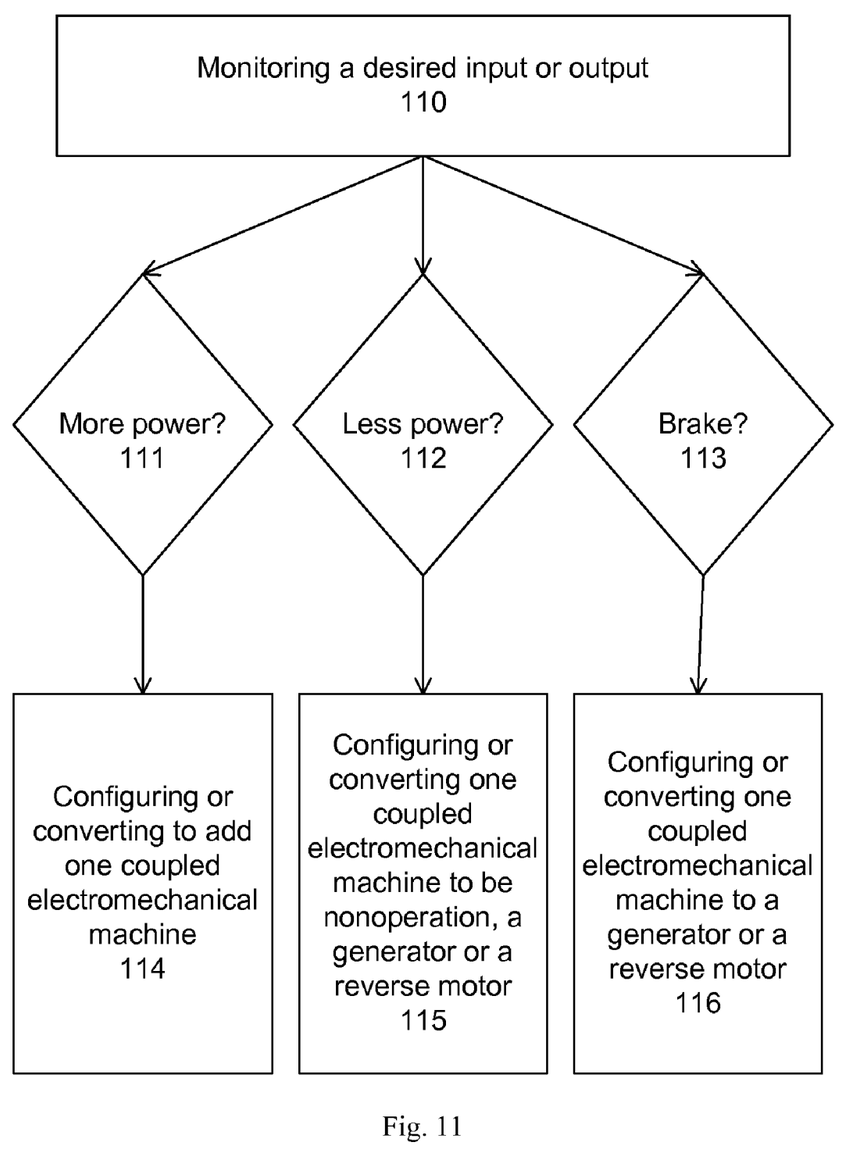
FIG. 11 illustrates another method of configuring an electromechanical machine according to an embodiment of the present invention.

FIG. 11 illustrates an embodiment of the present method. Operation 110 monitors a desired input or output. A desired input could be an input from an operator, such as an input to increase or reduce power. A desired output could be a predetermined setpoint, such as a desired power output or torque or speed. Acting as a feedback loop, when an output exceeds a setpoint, a signal can be generated to regulate the power. Operation 111 checks to see if the desired input or output requires more power, for example, more power for a motor or more power for a generator. If more power is needed, additional electromechanical machine(s) is configured or converted to add to the power output (operation 114). For example, if more motor power is needed, an idle machine is configured to a motor having the same rotation direction, or a generator is converted to a motor having the same rotation direction. If more electrical power is needed, a machine can be converted or configured to a generator.

Operation 112 checks to see if the desired input or output requires less power, for example, less power for a motor or less power for a generator. If less power is required, a currently running machine can be converted to be nonoperation, to a generator, or to a motor having opposite rotation direction (operation 115). For example, if less motor power is needed, a currently running motor can be converted to nonoperation, which will reduce the power output by reducing the number of running motors. Also, a currently running motor can be converted to a generator, which will reduce the power output and generate braking power. Further, converting to a generator allows the re-usage of the braking power, for example, by converting the braking power to electricity. Converting a currently running motor to a generator reduces the generated power (by reducing the number of running motors) and generates braking power, thus can be more effective in reducing power for the composite electromechanical machine. In an extreme case, all motors are converted to generators (e.g., all running and idle motors), thus zero power and maximum braking power are generated. Alternatively, an idle machine can be configured to a generator to generate a braking power. In this case, the generated power remains the same due to the same number of running power, but with the additional braking power to slow down the power output. In addition, a machine (either a running motor, an idle machine, or a generator) can be converted to a motor having opposite rotation direction. This conversion can actively reduce the running power of the motor, acting to fast brake, and even running to the opposite direction.

Operation 113 checks to see if the desired input or output requires brake, for example, a motor or a generator needing brake. A motor can require braking to slow down, and a generator such as one used in a wind turbine, can required braking due to strong wind. If braking is required, a currently running machine can be converted to a generator (operation 116), or a motor having opposite rotation direction.

While the invention has been described with reference to preferred embodiments, it is to be understood that the invention is not intended to be limited to the specific embodiments set forth above. For example, the magnetic component can be a planar magnetic component, or the electromechanical machine can be a linear motor.

What is claimed is:

1. An integrated electromechanical machine comprising
    at least two rotor/stator pairs having at least a winding
        wherein the two rotor/stator pairs are selected from a group consisting of
            a double-side rotor and two stators; and
            a double-side stator and two rotors; and
    a controller coupled to the rotor/stator pairs to configure at least a winding of the rotor/stator pairs,
    wherein the controller configures at least one of the rotor/stator pairs to be a motor, a generator and nonoperation,
    wherein the controller configures at least another of the rotor/stator pairs to be a motor, a generator, and nonoperation,
    wherein the at least one of the rotor/stator pairs is different from the at least another of the rotor/stator pairs.

2. An electromechanical machine as in claim 1 wherein configuring a winding of a rotor/stator pair comprises changing the function of the rotor/stator pair.

3. An electromechanical machine as in claim 2 wherein changing the function of the rotor/stator pair comprises changing one of a motor to a generator and a generator to a motor.

4. An electromechanical machine as in claim 2 wherein changing the function of the rotor/stator pair comprises changing a motor configuration to a generator configuration for motor braking.

5. An electromechanical machine as in claim 1 wherein configuring a winding of a rotor/stator pair comprises changing the phase wiring of at least one of a rotor and a stator.

6. An electromechanical machine as in claim 5 wherein changing the phase wiring comprises configuring the windings to different phases.

7. An electromechanical machine as in claim 5 wherein changing the phase wiring comprises configuring the windings to a higher number of phases for high torque and low speed spinning.

8. An electromechanical machine as in claim 1 further comprising a switching matrix coupled to the controller and the windings for configuring the rotor/stator pairs.

9. An apparatus comprising:
a plurality of coupled electromechanical machines integrated together with a common axis, each coupled electromechanical machine comprising a stator and a rotor with at least one being one of a shared stator and a shared rotor,
wherein the shared rotor comprises a double-sided rotor having a first rotor side facing a first stator side and a second rotor side facing a second stator side,
wherein the shared stator comprises a double-sided stator having a first stator side facing a first rotor core and a second stator side facing a second rotor core; and
a controller coupled to the coupled electromechanical machines to configure the coupled electromechanical machines,
wherein the controller configures at least one of the coupled electromechanical machines to be a motor, a generator and nonoperation,
wherein the controller configures at least another of the coupled electromechanical machines to be a motor, a generator, and nonoperation,
wherein the at least one of the coupled electromechanical machines is different from the at least another of the coupled electromechanical machines.

10. An apparatus as in claim 9 further comprising a plurality of sub-controllers, a sub-controller coupled to a electromechanical machine for configuring the electromechanical machine, and wherein the controller configures the plurality of sub-controller.

11. An apparatus as in claim 9 wherein configuring an electromechanical machine comprises changing the function of the electromechanical machine.

12. An apparatus as in claim 9 wherein configuring an electromechanical machine comprises changing the phase wiring of the electromechanical machine.

13. A method comprising:
providing a plurality of coupled electromechanical machines integrated together with a common axis, each coupled electromechanical machine comprising at least one of a double-sided stator and a double-sided rotor,
wherein the double-sided rotor comprising a first rotor side facing a first stator side and a second rotor side facing a second stator side, and
wherein the double-sided stator comprising a first stator side facing a first rotor core and a second stator side facing a second rotor core;
configuring at least one of the coupled electromechanical machines to be one of a motor, a generator, and nonoperation; and
configuring at least two of the coupled electromechanical machines to operate independent of each other.

14. A method as in claim 13 wherein configuring the coupled electromechanical machines comprises configuring at least one of the coupled electromechanical machines to be a motor, a generator, and nonoperation and configuring at least another of the coupled electromechanical machines to be one of a motor, a generator, and nonoperation.

15. A method as in claim 13 wherein configuring a coupled electromechanical machine comprises changing the function of the electromechanical machine.

16. A method as in claim 13 wherein configuring a coupled electromechanical machine comprises changing a motor configuration to a generator configuration for motor braking.

17. A method as in claim 13 wherein configuring a coupled electromechanical machine comprises changing a motor configuration to a nonoperation configuration for power reducing.

18. A method as in claim 13 wherein configuring a coupled electromechanical machine comprises changing a generator, and nonoperation configuration for power increase.

* * * * *